United States Patent [19]
Lee

[11] Patent Number: 5,566,016
[45] Date of Patent: Oct. 15, 1996

[54] LASER BEAM SCANNER

[75] Inventor: Chul-woo Lee, Seoul, Rep. of Korea

[73] Assignee: Samsung Electro-Mechanics Co., Inc., Kyungki-do, Rep. of Korea

[21] Appl. No.: 455,233

[22] Filed: May 31, 1995

[30]     Foreign Application Priority Data

Jan. 24, 1995 [KR] Rep. of Korea .......................... 95-1220

[51] Int. Cl.[6] ............................................... G02B 26/08
[52] U.S. Cl. ........................... 359/206; 359/207; 359/216; 359/662; 347/259
[58] Field of Search ...................................... 359/205–207, 359/216–219, 708, 710, 711, 717, 662, 212; 347/258–261, 244

[56]                 References Cited

U.S. PATENT DOCUMENTS 5,196,957   3/1993   Brueggemann ........................ 359/206
5,221,986   6/1993   Itabashi ................................... 359/206

*Primary Examiner*—James Phan
*Attorney, Agent, or Firm*—Leydig, Voit & Mayer

[57]                 ABSTRACT

A laser beam scanner is composed of an optical source, a beam deflector for deflecting the beam emitted from the optical source and a sensitive drum for performing printing and photosensitive processes from the beam after its deflection by the beam deflector. Also, the laser beam scanner comprises an f-θ lens between the beam deflector and sensitive drum for increasing resolution. The f-θ lens is composed of a first lens for correcting aberrations and a second lens for correcting the deflected beam passed through the first lens. The f-θ lens is made of plastic whose cost is lower than that of glass and can be easily manufactured since the beam emitting surface of the f-θ lens is spherical.

4 Claims, 4 Drawing Sheets

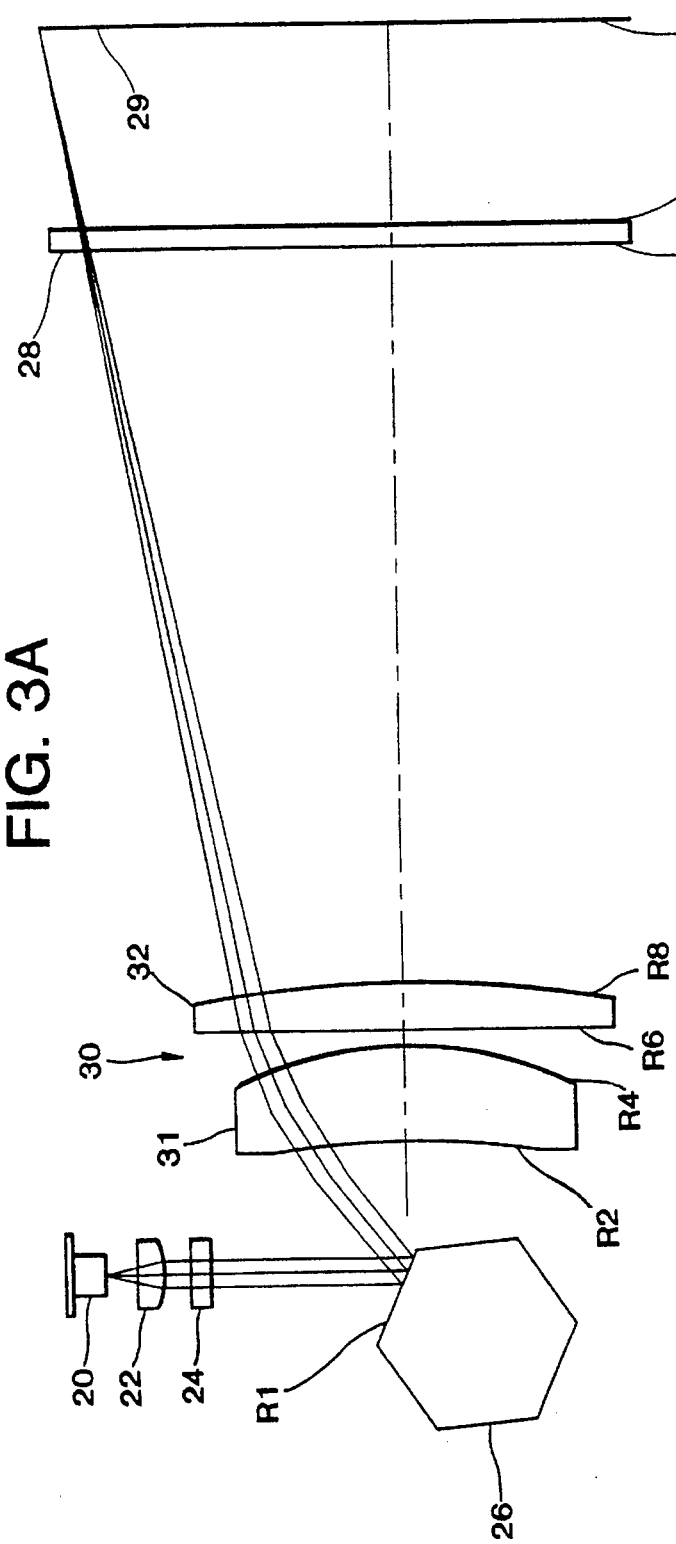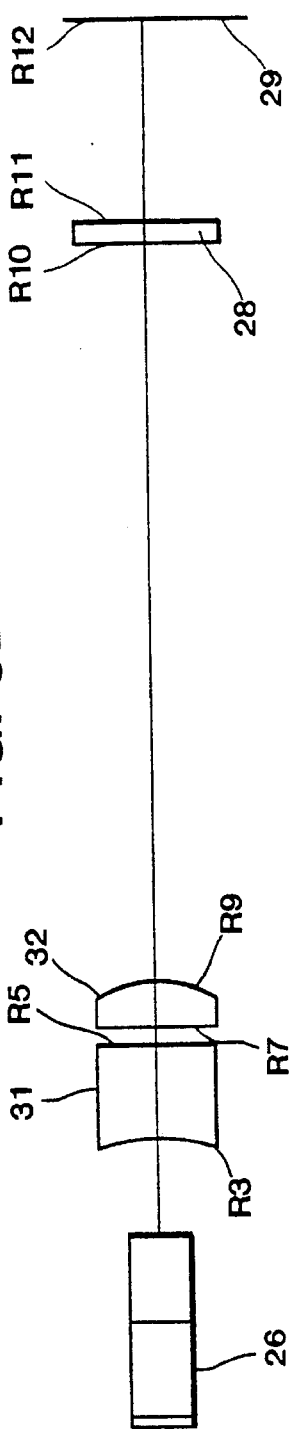
FIG. 3A
FIG. 3B

LASER BEAM SCANNER

BACKGROUND OF THE INVENTION

The present invention relates to a laser beam scanner used in a laser printer or character reader, and more particularly, to a laser beam scanner including an improved f-θ lens, in which characteristics of beam-scanning a sensitive drum are improved, thereby provides an output of higher resolution.

A laser beam scanner forms an image on a recording medium through main scanning using a laser beam deflector and sub-scanning using rotation of the sensitive drum.

FIG. 1 is a schematic showing the arrangement of the optical structure of a conventional laser beam scanner.

Referring to FIG. 1, the laser beam scanner is composed of an optical source 1 for emitting a laser beam, a beam deflector 5 for deflecting the beam emitted from optical source 1 to perform the main scanning with respect to a sensitive drum 8, and an f-θ lens 7 for correcting errors included in the optical signal deflected from beam deflector 5. A collimating lens 4 for collimating the beam emitted from optical source 1 is positioned between optical source 1 and beam deflector 5. Also, an optical modulator 2 may be included according to the type of optical source 1 and a reflecting mirror 3 for reflecting an optical pathway may also be employed. As beam deflector 5, a rotary optical polygon 6 having multi-reflecting layers is generally adopted for performing high speed scanning.

Beam 9 is incident on rotary optical polygon 6 from a constant direction and rotary optical polygon 6 rotates in one direction, so that the direction of beam 10 scanning sensitive drum 8 after reflection from rotary optical polygon 6 is determined according to the angle formed between the reflecting surfaces of rotary optical polygon 6 and the incident beam.

If the reflecting surfaces are tilted or the shaft has shifted due to an error during the manufacture of rotary optical polygon 6, a stain caused by the scanning line is generated when an image is formed, which prevents an output of high resolution. To solve this problem, f-θ lens 7 and a cylindrical lens (not shown) are utilized.

The beam is incident on the reflecting surface by the cylindrical lens, thereby correcting a problem in that the position of the optical spot scanned on sensitive drum 8 experiences jitter since the reflecting surfaces of rotary optical polygon 6 are tilted. Thus, even though the beam is not incident on the reflecting surfaces in parallel due to the tilting of the reflected surface, the optical spot is always formed on the same position of the sensitive drum. In this case, when the beam is incident parallel to with the optical axis of fθ lens, the beam passing through the aspherical surface of the lens is not properly focused on an image forming surface. Thus, the cylindrical lens is disposed in front of the rotary optical polygon, to thereby scan the sensitive drum with the portion of the beam having a round cross-section.

The f-θ lens 7 which is adopted to increase the resolution controls the pathways of beams scanning the sensitive drum after deflection by beam deflector 5 at the same interval and corrects the distortion and aberration of the beam caused by any error in the manufacture of the beam deflector.

FIGS. 2A and 2B are a cross-sectional view and a perspective view, respectively, showing the f-θ lens of the conventional laser beam scanner, respectively.

Referring to FIGS. 2A and 2B, the structure of the conventional laser beam scanner and problems thereof will be described below.

The f-θ lens 7 is composed of two lenses including a first lens 7a and a second lens 7b. The beam emitting surface S of second lens 7b an aspherical surface whose curvature is different from that of spherical surface R represented as a dashed line.

It is technically very difficult to process the lens. Also, if the lens member is made of a material such as glass, there is the problem of high cost.

SUMMARY OF THE INVENTION

To solve the above problems, it is an object of the present invention to provide a laser beam scanner adopting an f-θ lens having a spherical surface which is easily processed and which is made of low cost plastic.

To achieve the above object, there is provided a laser beam scanner comprising: an optical source; a beam deflector for deflecting the beam emitted from the optical source through predetermined angles; an f-θ lens for correcting the beam deflected from the beam deflector; and a rotating sensitive drum for performing printing and sensitive processing from the beam scanned after passage through the f-θ lens, wherein the f-θ lens is composed of a first lens whose incident surface and emitting surface have a negative refractive surface, and a second lens which is located adjacent to the first lens and whose incident surface is flat or has a negative refractive surface and emitting surface has a negative refractive surface.

Therefore, the f-θ lens of the present invention can be easily processed since the curvature of f-θ lens is spherical. Also, since the f-θ lens can be made of plastic, the cost can be very low. In addition, it is accurate for high resolution printing and photosensitive processes.

BRIEF DESCRIPTION OF THE DRAWINGS

The above objects and advantages of the present invention will become more apparent by describing in detail preferred embodiments thereof with reference to the attached drawings in which:

FIGS. 3A and 3B are schematics showing the arrangement of the optical structure of a laser beam scanner according to the present invention.

DETAILED DESCRIPTION OF THE INVENTION

Figure 1:
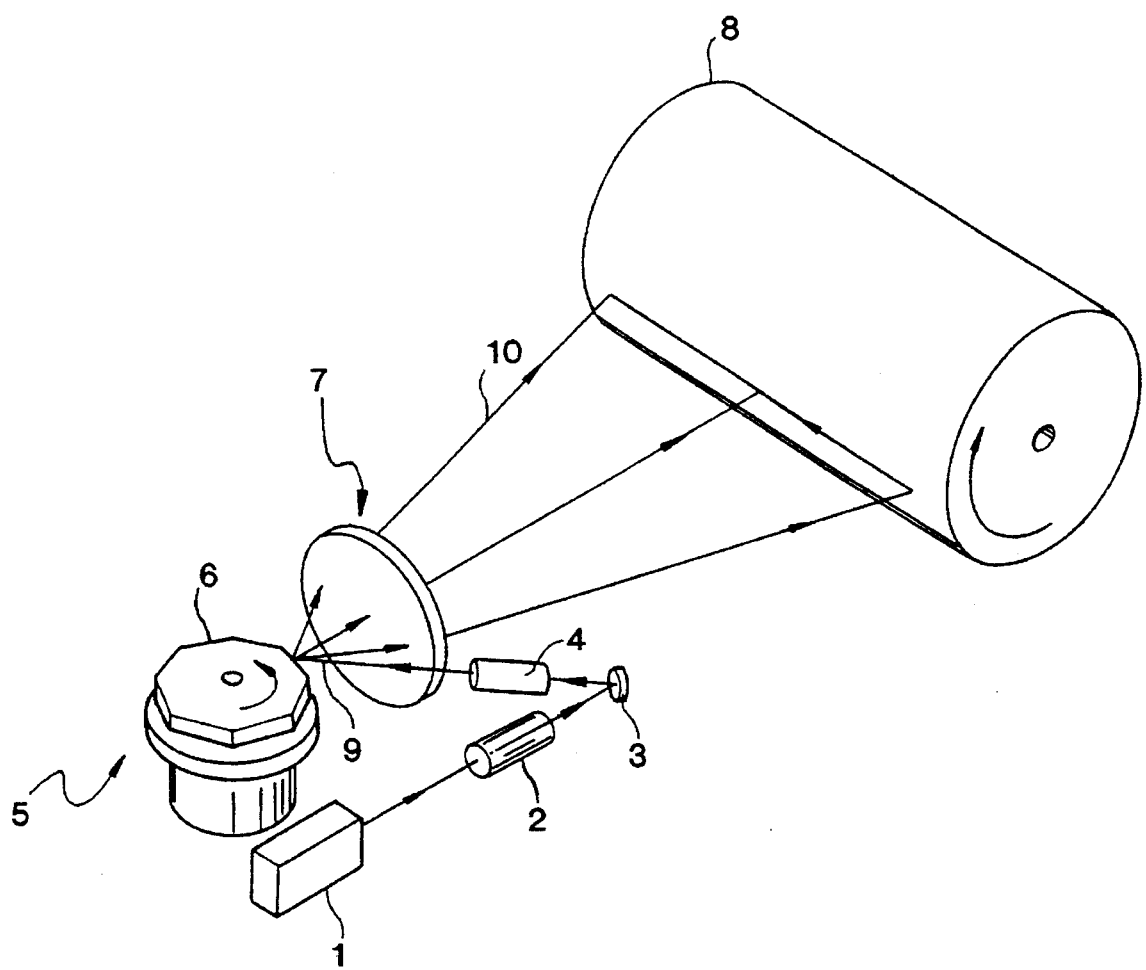
FIG. 1 is a schematic showing the arrangement of the optical structure of a conventional laser beam scanner.
Figure 2A:
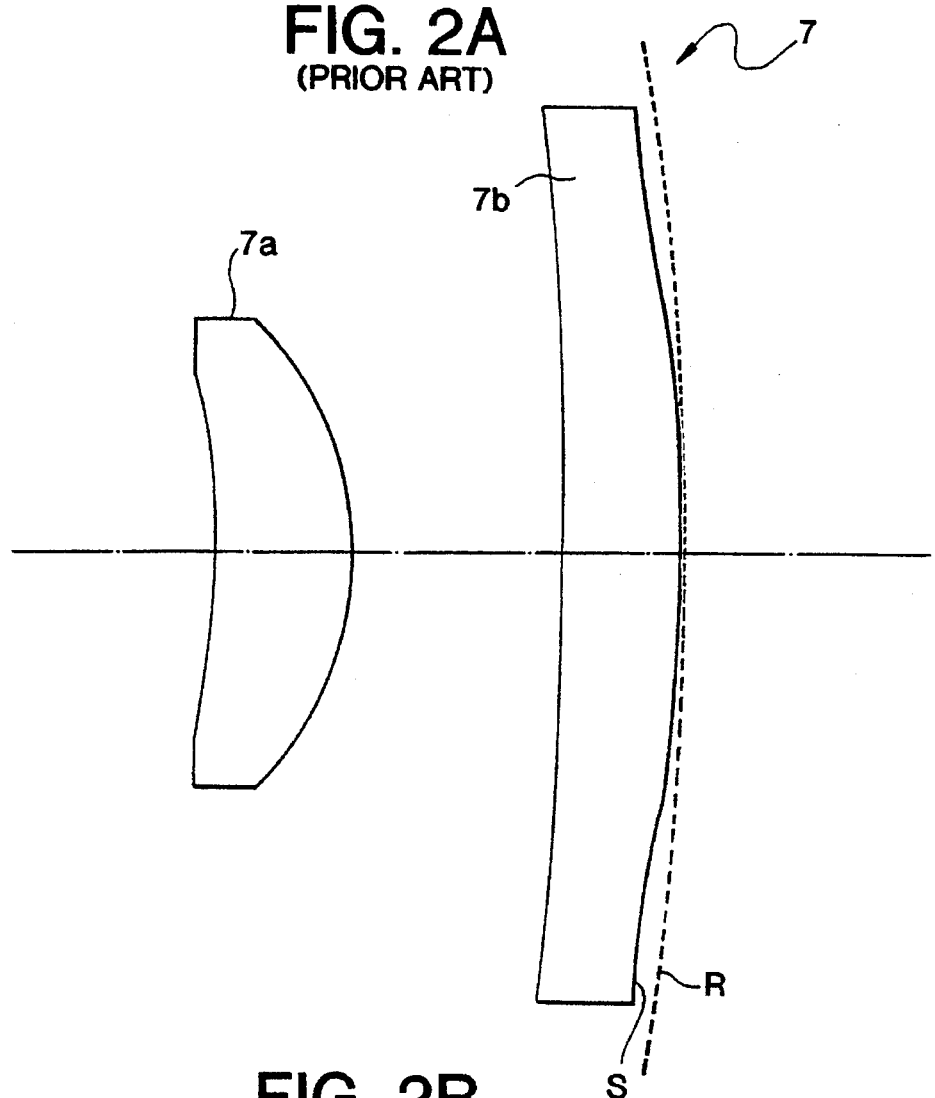
FIGS. 2A and 2B are schematics showing the optical structure of an f-θ lens adopted in the conventional laser beam scanner.
Figure 2B:
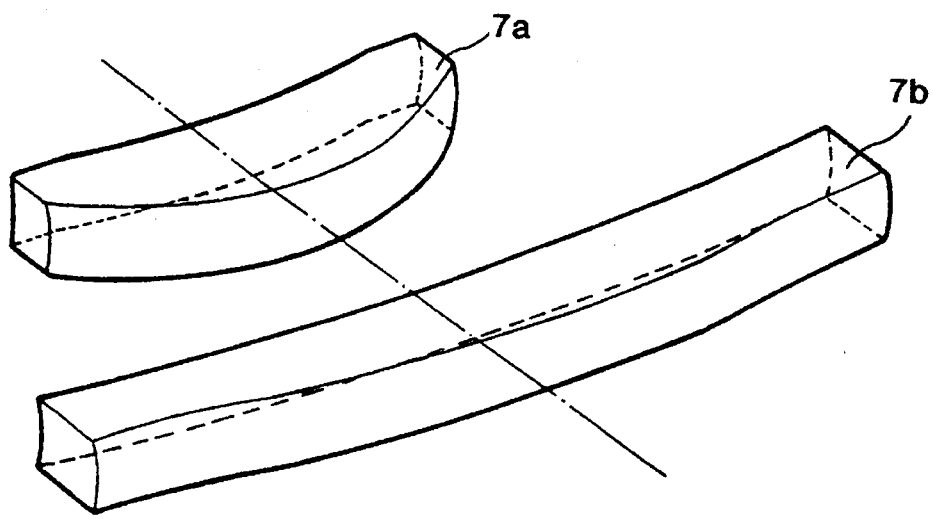

As shown in FIGS. 3A and 3B, the laser beam scanner according to the present invention comprises an optical source 20, a collimating lens 22 for collimating the beam emitted from the optical source 20, a beam deflector 26, such as a rotary optical polygon, for deflecting in predetermined directions the beam that has passed through the collimating lens 22 in an f-θ lens 30 for correcting an aberration such as a spherical surface aberration included in the beam deflected by the beam deflector 26, and a sensitive drum 29 for performing printing and photosensitive processes from the scanned beam. Also, a cylindrical lens 24 for correcting aberration of the incident beam may be disposed between collimating lens 22 and the beam deflector 26, and a cover glass 28 for protecting the sensitive drum 29 may be disposed between the f-θ lens 30 and the sensitive drum 29.

Figure 4A:
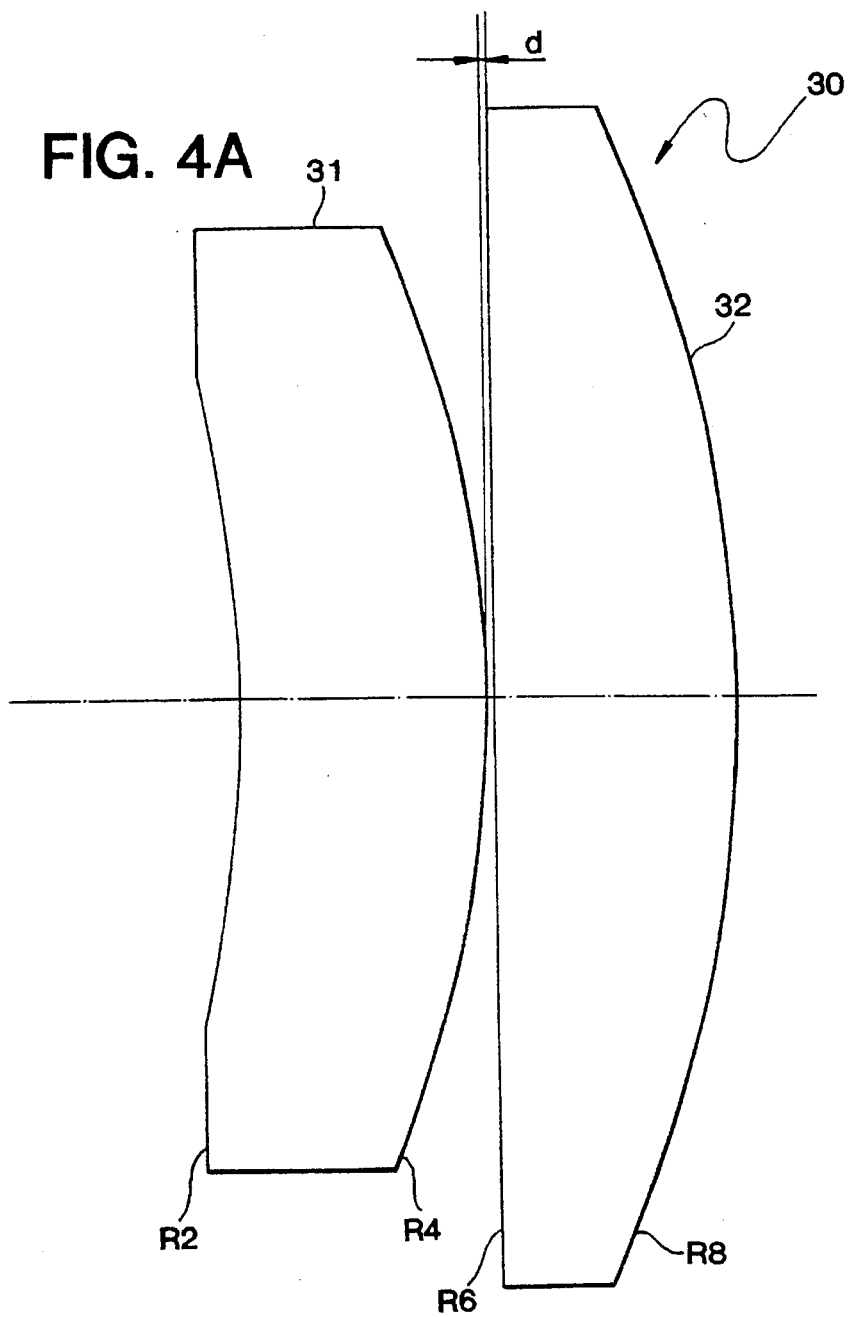
FIGS. 4A and 4B are schematics showing the optical structure of an f-θ lens adopted in the laser beam scanner according to the present invention.
Figure 4B:
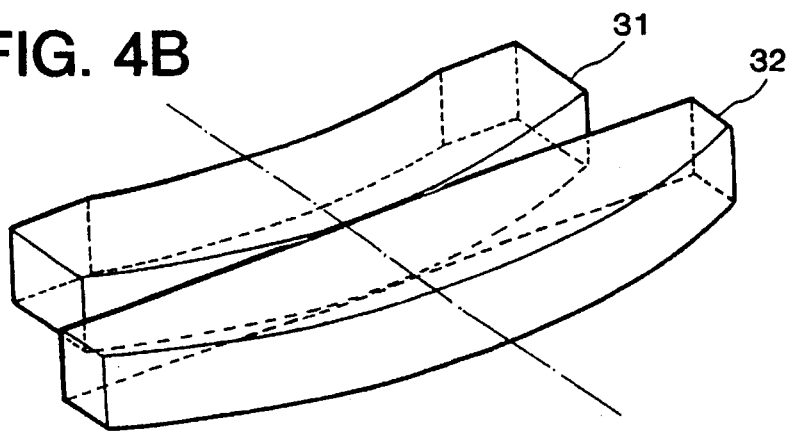

As shown in FIGS. 4A and 4B, the f-θ lens is composed of first and second lenses 31 and 32 which are made of plastic and whose refractive index is 1.48±15%. First lens 31 corrects for astigmatism included in the beam deflected by the beam deflector 26 and focuses the beam. As the thickness of the lens is increased, aberration can be easily controlled. Second lens 32 corrects the scanned beam. The first lens 31 is located nearer the beam deflector and has an incident surface R2 or which the beam deflected by the beam deflector incident and an emitting surface R4 from which the beam is emitted, wherein both surfaces have negative curvature. The second lens 32 is disposed or the same optical axis at a predetermined distance d from first lens 31. The incident surface of second lens 32 is flat and the emitting surface has a negative (concave) curvature. Since the first lens 31 and the second lens 32 are spherical toric lenses having cylindrical emitting surfaces, these lenses can be easily manufactured.

If the focal distances of the first and second lenses are $f_1$ and $f_2$ and the distance between them is d, the hypothetical focal distance f of the two lenses is as follows.

$$f = \frac{f_1 f_2}{f_1 + f_2 + d}$$

Accordingly, in the case where $f_1$ has a positive value and $f_2$ has a negative value, the value of the scanned beam is optimum. Thus, the d value should be decreased to increase synthetic focal distance f as much possible as.

As a result of a simulation, it is preferable that the interval between first and second lenses is within 10% of the minimum thickness of the two lenses.

Also, it is preferable that the thickness of the first lens is greater than that of the second lens so as to easily control aberration generated in the first lens.

One or more cylindrical lenses may be disposed on the optical axis between the optical source and the sensitive drum, for correcting aberrations included in the scanned beam. As a result, the characteristics of the beam are improved and high resolution printing or sensitive processing can be performed.

The reference characters shown in FIGS. 3A, 3B, 4A, and 4B are as follows: R1 is the reflecting surface of the beam reflector 26, R2 is the incident surface of first f-θ lens, R4 is the emitting surface of first f-θ lens 31, R6 is the incident surface of second f-θ lens, R8 is the emitting surface of second f-θ lens, R10 is the incident surface of cover glass 28, R11 is the emitting surface of cover glass 28, and R12 is the recording surface of the sensitive drum 29. Table 1 shows the curvature of each surface of the lenses, the thickness of each lens and the refractive index of each lens.

Thus, the laser beam scanner according to the present invention adopts an f-θ lens which can be easily processed since the curvature of f-θ lens is spherical. Also, since the f-θ lens may be made of plastic, the cost can be very low. In addition, the f-θ lens has the curvature and refractive index as shown in Table 1 and is useful for providing high resolution printing and the photosensitive processing.

TABLE 1

| lens surface | curvature (1/mm) | thickness (mm) | refractive index | remarks |
|---|---|---|---|---|
| reflecting surface R1 1st surface | 0 | 16 | 1 | rotary optical polygon |
| R2 | −0.01017 | 19.5 | 1.4845 | main scanning direction |
| R3 2nd surface | −0.05290 | — | — | sub-scanning direction |
| R4 | −0.01175 | 1 | 1 | main scanning direction |
| R5 3rd surface | −0.05713 | — | — | |
| R6 | 0 | 16.5 | 1.4845 | main scanning direction |
| R7 4th surface | −0.0241 | — | — | sub-scanning direction |
| R8 | −0.0111 | 134 | 1 | main scanning direction |
| R9 | −0.0530 | — | — | sub-scanning direction |
| 5th surface R10 | 0 | 2 | 1.51 | cover glass |
| 6th surface R11 | 0 | 18.446 | 1 | |
| 7th surface R12 | 0 | 0 | — | image forming surface |

What is claimed is:

1. A laser beam scanner comprising:
    an optical source for producing a light beam;
    a beam deflector for deflecting through predetermined angles the light beam emitted from said optical source;
    an f-θ lens for correcting the light beam deflected from said beam deflector; and
    a rotating light sensitive drum on which the light beam, after passage through said f-θ lens, is incident for printing wherein said f-θ lens comprises a first toric lens having a light incident surface and a light emitting surface with respective negative curvatures, and a second toric lens spaced a distance from and located adjacent to said first toric lens and having a planar light incident surface and a light emitting surface having a negative curvature, wherein said first toric lens and said second toric lens have respective, different thicknesses, and said first toric lens is separated from said second toric lens by a distance within ten percent of the smaller of the thicknesses of said first an second toric lenses.

2. A laser beam scanner as claimed in claim 1, wherein said f-θ lens is made of plastic having a refractive index is 1.48 (±15%).

3. The laser beam scanner as claimed in claim 1, wherein the thickness of said first toric lens is larger than the thickness of said second toric lens.

4. The laser beam scanner as claimed in claim 1, further comprising at least one cylindrical lens disposed on an optical axis between said optical source and said light sensitive drum for correcting aberration in the light beam.

* * * * *